May 3, 1932. J. HARRIS 1,856,555
INDUCTION ELECTRICITY METER
Original Filed Feb. 13, 1930 2 Sheets-Sheet 1
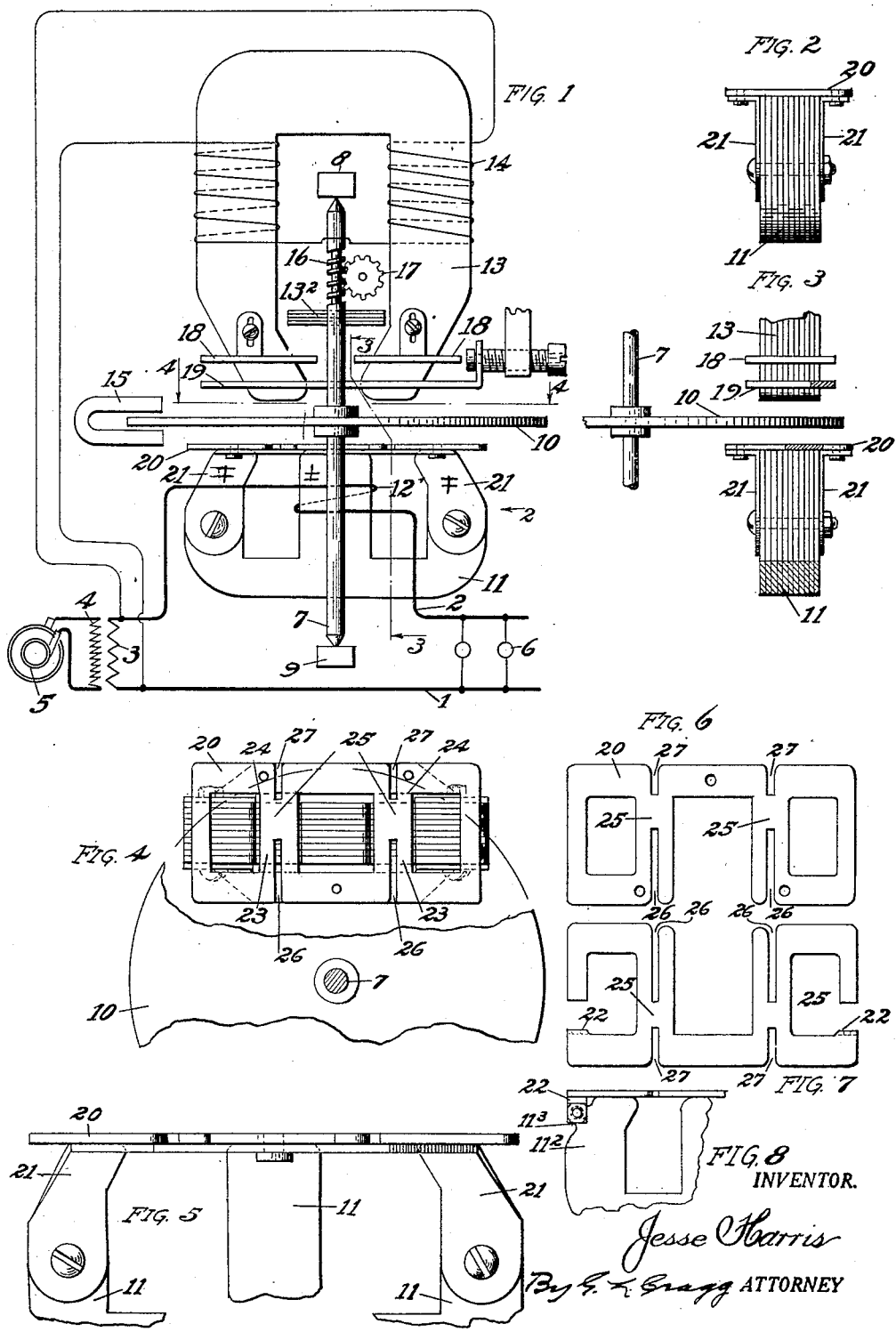

May 3, 1932.  J. HARRIS  1,856,555
INDUCTION ELECTRICITY METER
Original Filed Feb. 13, 1930  2 Sheets-Sheet 2
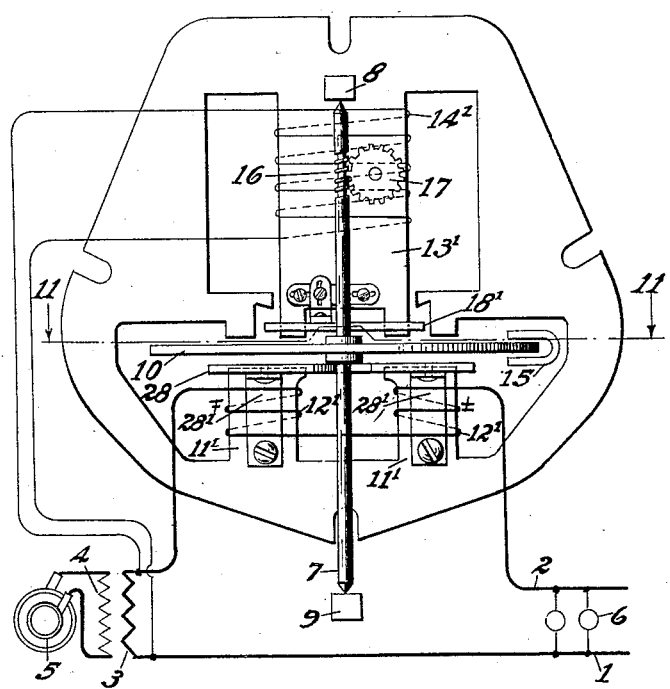
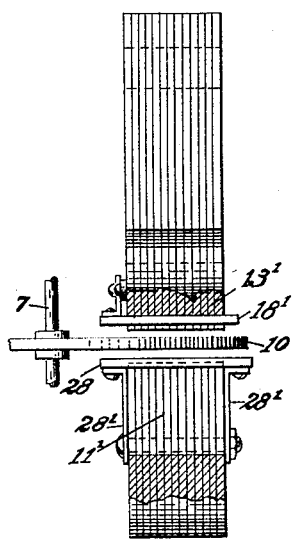
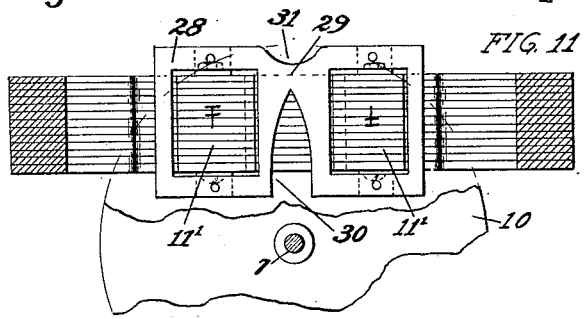
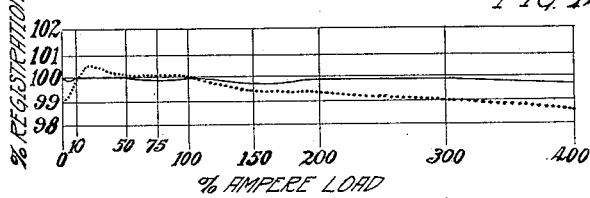
INVENTOR.
Jesse Harris
By G. L. Cragg ATTORNEY Patented May 3, 1932

1,856,555

UNITED STATES PATENT OFFICE

JESSE HARRIS, OF LA FAYETTE, INDIANA, ASSIGNOR TO DUNCAN ELECTRIC MANUFACTURING COMPANY, OF LA FAYETTE, INDIANA, A CORPORATION OF ILLINOIS

INDUCTION ELECTRICITY METER

Application filed February 13, 1930, Serial No. 428,046. Renewed September 23, 1931.

My invention relates to induction electricity meters of the general type disclosed in my copending application 356,485 and has for one object the improvement of the registration curve at unity power factor throughout the entire range of the meter and particularly that portion which extends beyond what is called the normal or full load rating of the meter, modern practice frequently calling for registration of loads of 200, 300 and 400%, and above, of the named rating. The invention has for another object the improvement of the registration curve for loads of fractional power factor, whether leading or lagging, up to 400%, and above, of the ampere rating.

An induction electricity meter is usually inclusive of an armature in the form of a metallic disc that turns within the air gap of a driving torque producing magnet system having current and pressure windings. Such armature, or a similar one in fixed relation thereto, turns within the field of flux produced by a permanent damping magnet. A suitable integrating device is driven by the armature.

According to well-known laws, the driving torque of such a meter is proportional to the first power of the torque-producing flux and the meter speed should be proportional to the torque. Error arises since the torque-producing flux in a lesser degree also effects a drag upon the armature that is proportional to the second power of this torque-producing flux and to the further fact that the permeability curve of the iron or steel in the magnetic circuit is not a straight line. Unless corrective means are employed, the meter will become slower and slower upon loads increasing beyond the normal or calibrated full load rating of the meter, the corresponding portion of the registration curve having a constantly increasing error.

At normal load the flux path including each such yoke has greater permeability than the flux path including the air gaps between the poles of the current magnet core so that, as the load is increased beyond normal, there is a differential action between the fluxes in the two paths. The differential action is brought about through increase in the saturation of said yokes and the restricted portions connected thereby, as the load increases beyond normal, whereby I secure the compensating effect of an increasing leverage of the active flux. I need not employ sensitive air gaps that must be carefully controlled. The air gaps in my arrangement may be comparatively long and of large cross section. I may also establish direct contact between the series core and my improved shunt. My compensator improves the over-all efficiency of meters, hitherto in commercial service, through the increase of torque without increase of losses or by keeping the torque constant while reducing losses.

With the device of my invention I am able to secure a much flatter load curve over a greater range than has heretofore been possible. I have actually procured a load curve from 5% to above 400% load with a total deviation from one hundred percent accuracy of only three-tenths of one percent, and it is expected that this load range will be largely increased when the new principles of my invention are taken advantage of fully.

In many cases where saturable shunts have been used, the accuracy on fractional power factors has been lessened rather than improved, but with the aid of the compensator of my invention the load curves at low power factors are substantially as correct as those at unity power factor.

I will explain my invention more fully by reference to the accompanying drawings in which Fig. 1 is a view diagrammatically illustrating one form of my invention in a well known type of meter and a circuit with which the meter may be associated; Fig. 2 is a view of a portion of the meter looking in the direction of arrow 2, Fig. 1; Fig. 3 is a sectional view on line 3—3 of Fig. 1; Fig. 4 is a sectional view on line 4—4 of Fig. 1; Fig. 5 is a view in elevation of a part of the meter on a larger scale; Figs. 6 and 7 are views illustrating other forms of overload compensators; Fig. 8 is a view in elevation of a fragment showing the support used for the compensator of Fig. 7; Fig. 9 illustrates another form of meter with an overload compensator of suitable design, a system of distribution being also diagrammatically indicated; Fig. 10 is a side view of the meter shown in Fig. 9, with parts removed and other parts broken away; Fig. 11 is a sectional view on line 11—11 of Fig. 9; and Fig. 12 shows a load curve in full line at unity and another load curve in dotted line at 50% power factor.

In each distribution system shown in Figs. 1 and 9 transmission mains, 1, 2, are supplied from a suitable source of current which may be the transformer secondary 3 whose primary 4 is shown as being supplied from an alternating current generating dynamo 5. Each load illustrated is in the form of incandescent electric lamps 6 but may be both or either inductive or non-inductive. The energy consumed by each load is measured by a watt-hour meter which is inclusive of an upright spindle or shaft 7 suitably held in bearings 8 and 9. A closed metallic conductor, preferably a horizontal aluminum armature 10, is carried by each meter spindle on which the disc is rigidly secured. The disc is turned proportionately to the energy consumed by the load by a magnet system that is inclusive of a current or series winding and a pressure or shunt winding.

In the meter shown in Figs. 1 to 8 inclusive, the current magnet has an E-shaped laminated core 11 whose middle leg is surrounded by a coil 12 serially included in the main 2. The core and its poles are upon the lower side of the armature. As is understood, all of the poles alternate in sign, the outside poles being coincidently of either sign while the middle pole is of the opposite sign, as though two U-shaped cores were arranged to be coplanar with poles of similar sign placed together and surrounded by one current coil. In the meter shown in Figs. 9, 10 and 11 the E-shaped current core is replaced by a core $11^1$ which is essentially U-shaped in its relation to the current winding, each of two limbs being surrounded by a coil $12^1$. The two poles are coincidently of opposite sign and alternate in polarity. The U-shaped core of this meter is thus essentially one-half of the E-shaped core of the other meter. The pressure magnet of the first meter is upon the upper side of the corresponding armature. It is inclusive of a U-shaped laminated iron core 13 whose legs are surrounded by the coils 14 which are connected in series in the same bridge between the distributing mains 1 and 2. The pressure core of the meter of Figs. 9, 10 and 11 is also upon the top side of the armature, but it is of E shape, its middle leg $13^1$ being surrounded by the pressure coil $14^1$. The speed of the armature of each meter is checked by a permanent magnet, diagrammatically indicated at 15, which embraces the peripheral portion of the disc with which it is in inductive relation. Each meter thus has a motor whose armature 10 and spindle 7 turn proportionately to the wattage in a manner well known to those familiar with the art. A worm 16 is provided upon each spindle 7 and is in mesh with a pinion 17 that is in driving relation with the counting train of the corresponding meter, as is well understood without the necessity of further illustration.

In the meter of Figs. 1 to 8 inclusive quadrature relation on unity power factor of the magnetic field due to the current and pressure windings is effected by means of closed conductors 18—18 which surround the ends of pressure core 13 and are adjustable for calibration along these core ends to regulate the secondary relation of these conductors with the pressure winding 14. The conductors 18—18 may be in the nature of non-magnetic metallic plates with holes therethrough, through which the ends of the core 13 are passed. In this meter, a non-magnetic metallic plate 19 has two holes bored therethrough through which the ends of the core 13 are also passed to provide closed conductors that compensate for friction. This plate is adjustable for calibration crosswise of the limbs of the core 13. In the meter of Figs. 9, 10 and 11 the two conductors 18, 19 are replaced by a single conductor $18^1$ in the form of a hollow square that surrounds the forked end of core leg $13^1$ and which is adjustable vertically for quadrature and horizontally for friction.

The overload compensator 20 in the meter of Figs. 1 to 8 is a magnetic plate having three apertures or openings therein in which the three polar portions or legs of the core 11 are respectively received or with which legs said openings are aligned. This plate may be made of iron such as Norway iron or of 1% silicon steel or of any one of several magnetic alloys, the proportioning of the parts varying with the alloy selected, and it is possible to use various alloys with the same set of manufacturing tools by providing notching tools to vary the dimensions of the restricted portions.

In the construction shown in Figs. 1 to 6 inclusive, the compensator is totally spaced from the polar portions by air gaps, and is supported by brackets 21—21 which may be formed of any non-magnetic metal. In the construction shown in Figs. 7 and 8 the brackets 21—21 are omitted and ears 22 are struck down from the compensator 20. These ears are bolted to a special lamination $11^2$ that has projecting ears $11^3$ for the purpose. The core and compensator thus have direct contact and are included in a magnetic circuit that, itself, has no gaps. The forms shown in Figs. 6 and 7 are produced with remnants that may be used in the formation of the magnetic shunt $13^2$ for the pressure core 13. The restricted portions 23—23 and 24—24 and yokes 25—25 joining them are produced by the pairs of aligned notches 26, 27 that extend transversely of the core over but a part of it. The yokes bridge the notches to maintain the compensator intact and to function magnetically. The parts 23, 24, 25 respectively approach saturation at different points on the load curve to produce load curve performance such as indicated in Fig. 12.

The yokes 25 have greater shunting effect than the remaining portions of the shunting compensator 20 to render the current core portion lapped by the yokes more permeable than the remainder of the core. Also the gaps 26, 27, 30 by reducing the shunting effect of the compensator portion where these gaps are located render the portion of the core underlying these gaps less permeable than the balance of the core which is shunted by the yokes. There is thus provided in the meter having the compensator 20 a current core including two portions of differing permeability in parallel in the magnetic circuit, both of such core portions being surrounded by the current winding. The core portion of greater permeability is preferably further from the axis of rotation of the meter than the other core portion. It is evident that the compensator in its action throughout the range of the various loads on the meter influences the field form or distribution of the torque-producing interacting fluxes passing across the gap and through the disc and that due to the compensator such field form or distribution of the various fluxes is modified or changed at various loads on the meter. With the structure used such change in distribution or field form of the flux may occur in a direction radial with respect to the disc or it may occur in a direction tangential to the disc at the driving element. In either case, as is well known in the art, such change or modification of distribution or field form of flux crossing the gap will modify the resultant torque produced at a given meter load and thus contribute to the corrective effect produced by the compensator.

The compensator 20 is made of a single lamina of Norway iron one thirty-second inch in thickness and the yoke portions 25—25 are eleven thirty-seconds inches wide and the restricted portions 23—23 are nine sixty-fourths inches wide, as are also the restricted portions 24—24. These last portions approach saturation less rapidly than portions 23—23 because they are shorter and because they are not in so favorable a location to gather flux. In the compensator of Fig. 6, the yokes 25—25 are seven thirty-seconds inches wide, while in Fig. 7 they are slightly narrower. The other proportions of the compensator 20 are easily obtainable as the drawings are practically to scale. The yoke 29 of Figures 9, 10 and 11 has greater shunting effect than the remaining portions of the shunting compensator 28 to render the current core portion lapped by the yoke more permeable than the remainder of the core. Also the gap 30 by reducing the shunting effect of the compensator portions where this gap is located renders the portion of the core underlying this gap less permeable than the balance of the core which is shunted by the yoke. There is thus provided in the meter having the compensator 28 a current core including two portions of differing permeability in parallel in the magnetic circuit, both of such core portions being surrounded by the current winding. The core portion of greater permeability is further, preferably from the axis of rotation of the meter than the other core portion.

It will be noted that the yoke portions 25—25 are not placed symmetrically with reference to the polar portions of the core 11 but are located so as to shunt at normal load more of the flux from the outer sides of the pole portions so that the half or other selected portion of the laminæ of the core 11 that is more remote from the armature disc shaft is shunted more than the portion of the laminæ nearer to the disc shaft. That is the middle of each yoke 25 is beyond the median plane of core 11 that is parallel with the laminæ of this core. On normal load this results in the effective center of the flux from the current core being closer to the shaft 7 than on the overloads at which the yoke portions 25—25 become saturated. As a result, the effective center of the flux from the core 11 moves outwardly from the shaft 7 at high overloads thus giving greater leverage and proportionately more torque tending to assist the saturable yoke portions 25—25 to produce a straight load curve. The return path for the outer half of the core 11 is thus also caused to have less reluctance and more permeability than the other half of the core. Furthermore, the location of the yoke portions 25—25 appears to have a bearing on the light load performance of the meter for if the compensator 20 is turned over so as to bring the yoke portions 25—25 closer to spindle 7 not only is the overload performance of the meter made somewhat less favorable, but the light load performance is also affected unfavorably.

The true explanation of the favorable effect of the compensator 20 is not definitely known but it is my present opinion that most of whatever flux is gathered in by the compensator 20 at light loads is carried through the various portions of the compensator 23, 24 and 25; also that as the load becomes greater, the portions 23—23 become more or less saturated so that they no longer conduct their former proportion of flux to the yoke portions 25 but instead a part of their flux tends to jump the gaps 26—26 and a portion of this flux cuts the disc and increases the meter speed. As the load increases further, the restricted portions 24—24 become more or less saturated forcing flux to jump the gaps 27—27 and thus to cut the disc and increase the torque and so straighten the load curve. At the time the yoke portions 25—25 are nearing saturation, they probably receive very little flux gathered in by portions of the compensator that are not in direct line with the laminæ over which the yoke portions are placed. Said yoke portions are probably the last to approach saturation so that their effect is reserved for the very high overloads. The function of shunt 28 in the structure of Figs. 9, 10 and 11 may also be generally somewhat similarly explained. This shunt 28 desirably has awo aligned notches 30 and 31 that are bridged by yoke 29.

Changes may be made without departing from the invention.

Having thus described my invention, I claim:

1. A rotating induction electricity meter including a driving torque producing magnet system having current and pressure windings, the current winding having a magnetizable core element having two legs of unlike polarity and including two portions in parallel in the magnetic circuit of this core element; a magnetic shunt having openings respectively receiving said legs, said shunt bridging parts of unlike polarity of one of said core portions and serving to increase the permeability of this core portion relatively to the other; a closed conductor forming a part of the rotating element of the meter; the core portion of greater permeability being further from the axis of rotation of said element than the other core portion.

2. A rotating induction electricity meter including a driving torque producing magnet system having current and pressure windings, the current winding having a magnetizable core element having two legs of unlike polarity; a magnetic shunt having openings respectively aligned with said legs and having a notch extending transversely of and over but one portion of the core element and having a yoke bridging the notch and lapping a second core portion paralleling the first and bridging parts of unlike polarity of the second core portion to increase the permeability of this core portion relatively to the permeability of the other; a closed conductor forming a part of the rotating element of the meter; and a damping magnet whose flux threads such conductor.

3. The meter of claim 2 wherein the core portion of greater permeability is further from the axis of rotation than the other core portion.

4. A rotating induction electricity meter including a driving torque producing magnet system having a current and pressure windings, the current winding having a magnetizable core element of E shape whose middle leg is surrounded by the current winding and which core element includes two portions in parallel in the magnetic circuit of this core element; a magnetic shunt having three openings respectively aligned with the three legs of said core element, said shunt bridging parts of unlike polarity of one of said core portions and serving to increase the permeability of this core portion relatively to the other; a closed conductor forming a part of the rotating element of the meter; and a damping magnet whose flux threads such conductor.

5. The meter of claim 4 wherein the core portion of greater permeability is further from the axis of rotation than the other core portion.

6. A rotating induction electricity meter including a driving torque producing magnet system having current and pressure windings, the current winding having a magnetizable core element of E shape whose middle leg is surrounded by the current winding; a magnetic shunt having three openings respectively aligned with the three legs of said core element and having notches extending transversely of and over but one portion of the core element and respectively located between the two outside and middle legs of the core element, said shunt having yokes bridging the notches and lapping a second core portion paralleling the first and bridging parts of unlike polarity of the second core portion to increase the permeability of this core portion relatively to the permeability of the other; a closed conductor forming a part of the rotating element of the meter; and a damping magnet whose flux threads such conductor.

7. The meter of claim 6 wherein the core portion of greater permeability is further from the axis of rotation than the other core portion.

8. A rotating induction electricity meter including a driving torque producing magnet system having current and pressure windings, the current winding having a magnetizable core element of E shape whose middle leg is surrounded by the current winding; a magnetic shunt having three openings respectively aligned with the three legs of said core element and having two pairs of notches one notch of each pair extending transversely over a portion of the core element that is nearest the meter axis, the other notch of each pair extending transversely over another portion of the core element that is further from the meter axis, said pairs of notches being respectively located between the two outside and middle legs of the core element, said shunt having yokes bridging the notches and lapping a third core portion that is between the first two and bridging parts of unlike polarity of this third core portion to increase the permeability of this core portion relatively to the permeability of the other two core portions; a closed conductor forming a part of the rotating element of the meter; and a damping magnet whose flux threads such conductor.

9. The structure of claim 8 wherein the notches that are further from the meter axis are shorter than the other notches.

10. A rotating induction electricity meter including a driving torque producing magnet system having current and pressure windings, the current winding having a magnetizable core element having two legs of unlike polarity and including two portions in parallel in the magnetic circuit of this core element; a magnetic shunt having openings respectively aligned with said legs and having two notches extending transversely of and over different portions of the core element and having a yoke bridging the notches and lapping a third core portion between the other two and bridging parts of unlike polarity of the third core portion to increase the permeability of this core portion relatively to the permeability of the others; a closed conductor forming a part of the rotating element of the meter; and a damping magnet whose flux threads such conductor.

11. The structure of claim 10 wherein the notch that is further from the meter axis is shorter than the other notch.

12. An induction watt-hour meter comprising a voltage electromagnet, a current electromagnet having a plurality of pole pieces, a rotatable disc mounted in an air gap traversed by magnetic flux produced by said current and voltage electromagnets and a shunt plate of magnetic material for said current electromagnet; said shunt plate being mounted in fixed relation to the current electromagnet and substantially parallel to the plane of the disc and on the opposite side of said disc from the voltage electromagnet so that it acts in a substantial degree to modify the flux from the voltage electromagnet which traverses the disc; the edge of said shunt plate being exposed to a plurality of current electromagnet pole pieces at more than one face of each of said pole pieces and separated therefrom by gaps along such edge so that a predominating portion of the current electromagnet flux which is shunted is constrained to enter the shunt plate through its edge; said shunt plate being shaped and proportioned to provide means whereby its various portions approach saturation in progressive relation as the load current is increased to modify the magnitude and distribution of the resultant current and potential flux through the disc and provide a substantial compensating effect for the heavy-load errors in the registration of said meter.

13. The meter of claim 12 wherein said shunt plate is shaped and positioned asymmetrically with respect to a plane perpendicular to the disc and passing through the center of the current electromagnet.

14. A rotating induction electricity meter including a driving torque producing magnet system having a current core embodying two legs of unlike polarity, and a magnetic shunt bridging said legs, said shunt having a notch in one side edge and whose inner end is located between the planes of the side faces of the core.

15. A rotating induction electricity meter including a driving torque producing magnet system having a current core embodying two legs of unlike polarity, and a magnetic shunt bridging said legs, said shunt having notches in respective side edges thereof, the inner ends of said notches being spaced apart transversely of the shunt and the inner end of one of the notches being located between the planes of the side faces of the core.

16. In an induction watt-hour meter, a current electromagnet having a plurality of pole pieces, and a shunt device extending between the pole pieces and spaced from more than one face of each of said pieces to provide air gaps.

17. In an induction watt-hour meter, a current electromagnet having a plurality of pole pieces, and a shunt device extending between the pole pieces and spaced from all the faces of one pole piece and more than one face of the remaining pole pieces to provide air gaps.

18. In an induction watt-hour meter, a current electromagnet having a plurality of pole pieces, and a shunt device extending between said pieces and surrounding all of them, said device being spaced from all the faces of one pole piece and from more than one face of the remainder to provide air gaps.

19. In an induction watt-hour meter comprising a voltage electromagnet, a current electromagnet having a plurality of pole pieces, a rotatable disc mounted in an air gap traversed by magnetic flux produced by said current and voltage electromagnets and a shunt plate of magnetic material for said current electromagnet; said shunt plate being mounted in fixed relation to the current electromagnet and substantially parallel to the plane of the disc and on the opposite side of said disc from the voltage electromagnet so that it acts in a substantial degree to modify the flux from the voltage electromagnet which traverses the disc; the edge of said shunt plate being exposed to a plurality of current electromagnet pole pieces at more than one face of each of said pole pieces and separated therefrom by gaps along such edge so that a predominating portion of the current electromagnet flux which is shunted is constrained to enter the shunt plate through its edge.

In witness whereof I hereunto subscribe my name.

JESSE HARRIS.